United States Patent
Swinkels et al.

(10) Patent No.: US 9,930,627 B2
(45) Date of Patent: Mar. 27, 2018

(54) METERED INTERFACE

(71) Applicants: Gerard Leo Swinkels, Ottawa (CA); Steve Clarke, Ottawa (CA); Sharon Margaret Chisholm, Ottawa (CA)

(72) Inventors: Gerard Leo Swinkels, Ottawa (CA); Steve Clarke, Ottawa (CA); Sharon Margaret Chisholm, Ottawa (CA)

(73) Assignee: Ciena Corporation, Hanover, MD (US)

( * ) Notice: Subject to any disclaimer, the term of this patent is extended or adjusted under 35 U.S.C. 154(b) by 224 days.

(21) Appl. No.: 14/754,408

(22) Filed: Jun. 29, 2015

(65) Prior Publication Data

US 2016/0381651 A1  Dec. 29, 2016

(51) Int. Cl.
*H04W 56/00* (2009.01)
*H04J 3/06* (2006.01)
*H04L 12/26* (2006.01)

(52) U.S. Cl.
CPC ........... *H04W 56/00* (2013.01); *H04J 3/0638* (2013.01); *H04L 43/0852* (2013.01)

(58) Field of Classification Search
None
See application file for complete search history.

(56) References Cited

U.S. PATENT DOCUMENTS

| | | | |
|---|---|---|---|
| 6,269,330 B1 | 7/2001 | Cidon et al. | |
| 6,360,271 B1 * | 3/2002 | Schuster | H04J 3/0632 370/516 |
| 6,405,250 B1 * | 6/2002 | Lin | H04L 41/046 700/29 |
| 2004/0073536 A1 * | 4/2004 | Smith-Semedo | G06F 1/14 |
| 2005/0025176 A1 * | 2/2005 | Ko | H04W 74/085 370/448 |
| 2005/0177643 A1 * | 8/2005 | Xu | H04N 21/242 709/231 |
| 2007/0224995 A1 | 9/2007 | Frederiksen et al. | |

(Continued)

OTHER PUBLICATIONS

"A Comparison of Multicast Feedback Control Mechanisms", Shuju Wu et al., Apr. 4, 2005 (8 pages).

(Continued)

*Primary Examiner* — Ayaz R Sheikh
*Assistant Examiner* — Tarell A Hampton
(74) *Attorney, Agent, or Firm* — Osha Liang LLP (57) ABSTRACT

A method for executing a network command using synchronized timers. The method includes obtaining, by a first device, a first current time value from a first timer of the first device, determining, by the first device, a time-to-execute value based on the first current time value, sending, from the first device to a second device, a first network command message including the network command and the time-to-execute value, repetitively obtaining, by the second device, a second current time value from a second timer of the second device, comparing, by the second device and in response to receiving the first network command message, the second current time value to the time-to-execute value extracted from the first network command message, and executing, by the second device and in response to the second current time value matching the time-to-execute value, the network command, wherein the first timer and the second timer are synchronized.

17 Claims, 4 Drawing Sheets

(56) References Cited

U.S. PATENT DOCUMENTS

| | | | | |
|---|---|---|---|---|
| 2008/0259966 A1* | 10/2008 | Baird | ............... | H04J 3/0632 |
| | | | | 370/503 |
| 2010/0174783 A1* | 7/2010 | Zarom | ............... | G06F 9/526 |
| | | | | 709/205 |
| 2010/0257280 A1* | 10/2010 | Stokking | ............ | H04L 65/80 |
| | | | | 709/231 |
| 2010/0329284 A1* | 12/2010 | Wong | ............... | H04J 3/0641 |
| | | | | 370/503 |
| 2011/0142078 A1* | 6/2011 | Wong | ............... | H04J 3/0679 |
| | | | | 370/503 |
| 2013/0031253 A1 | 1/2013 | Hui et al. | | |

OTHER PUBLICATIONS

"Routing Requirements for Urban Low-Power and Lossy Networks", M. Dohler et al., May 1, 2009 (21 pages).
Extended European Search Report issued in European Patent Application No. 16176022.8 dated Nov. 24, 2016 (7 pages).
"Transaction Language 1", http://en.wikipedia.org/wiki/Transaction_Lanuage_1, (obtained from http://web.archive.org/web/20041116125501/http://en.wikipedia.org/wiki/Transaction_Language_1), Oct. 27, 2004, 3 pages.
"Representational State Transfer", http://en.Wikipedia.org/wiki/Representational_state_transfer, (obtained from http://web.archive.org/web/20050304013226/http://en.wikipedia.org/wiki/Representational_state_transfer), Mar. 4, 2005, 1 page.
"Linux Tip:Job Scheduling with Cron and At", http://www.ibm.com/developerworks/library/l-job-scheduling/, Jul. 18, 2007, 6 pages.

\* cited by examiner

METERED INTERFACE

BACKGROUND

A network (e.g., a telecommunication network) may have a data plane that includes devices exchanging network traffic, and a control plane that controls how network traffic is routed in the data plane. Operations support systems (OSSs) in the control plane are computer systems used by telecommunication service providers to manage telecommunication networks, such as telephone networks. OSSs and data plane devices (referred to as Network Elements (NEs)) exchange messages to perform management functions, such as network inventory, service provisioning, network configuration and fault management, etc. For example, the messages may be based on Transaction Language 1 (TL1), which is a widely used management protocol in telecommunications. In particular, operations domains (e.g., surveillance, memory administration, and access and testing) define and use TL1 messages to accomplish specific functions between the OSSs and the NEs.

A message (e.g., TL1 message) may include a command (which is simply a directive to a computer program in a receiving device of the message) to perform a specific task. The command that specifies a task to be performed in a network may be referred to as a network command. The message that includes the network command may be referred to as a network command message. Typically, the receiving device executes (or otherwise processes) the command immediately after receiving the message, and also reports the associated response immediately. When the command is sent to a large number of receiving devices, problems may arise due to the timing difference (referred to as a command skew) with respect to when the command is received by any receiving device. For example, when a command is sent to more than ten NEs in a telecommunication network, each NE can receive and execute the command at different points in time. If the network operation requires simultaneous execution of the command at each NE, the command skew produces unreliable results of the command. In addition, the same command may be sent repeatedly to multiple NEs for frequent updating of specific system attributes. The transmission and processing of these responses from multiple NEs to the repeated commands cause system resource contention.

SUMMARY

In general, in one aspect, the invention relates to a method for executing a network command using synchronized timers. The method includes obtaining, by a first device, a first current time value from a first timer of the first device, determining, by the first device, a time-to-execute value based at least on the first current time value, sending, from the first device to a second device, a first network command message comprising the network command and the time-to-execute value, repetitively obtaining, by the second device, a second current time value from a second timer of the second device, comparing, by the second device and in response to receiving the first network command message, the second current time value to the time-to-execute value extracted from the first network command message, and executing, by the second device and in response to the second current time value matching the time-to-execute value, the network command, wherein the first timer and the second timer are synchronized.

In general, in one aspect, the invention relates to a system. The system includes a computer network coupling a first device and a second device, the first device having a first timer and configured to obtain a first current time value from the first timer, determine a time-to-execute value based at least on the first current time value, and sending, to the second device via the computer network, a first network command message comprising a network command and the time-to-execute value, and the second device having a second timer and configured to repetitively obtain a second current time value from the second timer of the second device, compare, in response to receiving the first network command message, the second current time value to the time-to-execute value extracted from the first network command message, and execute, in response to the second current time value matching the time-to-execute value, the network command, wherein the first timer and the second timer are synchronized.

In general, in one aspect, the invention relates to a non-transitory computer readable medium storing instructions for executing a network command using synchronized timers. The instructions include functionality for obtaining, by a first device, a first current time value from a first timer of the first device, determining, by the first device, a time-to-execute value based at least on the first current time value, sending, from the first device to a second device, a first network command message comprising the network command and the time-to-execute value, repetitively obtaining, by the second device, a second current time value from a second timer of the second device, comparing, by the second device and in response to receiving the first network command message, the second current time value to the time-to-execute value extracted from the first network command message, and executing, by the second device and in response to the second current time value matching the time-to-execute value, the network command, wherein the first timer and the second timer are synchronized.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system, a method, and a computer readable medium to control when commands are processed at receiving devices. For example, commands may be executed by multiple receiving devices to generate repetitive response output streams. Once the command is executed by a receiving device, the corresponding response output is generated after a pre-determined delay and repeats for a pre-determined number of times. In one or more embodiments, the time point when the command is processed/executed by each receiving device, as well as the pre-determined delay, are based on a synchronized network time, such as a time-of-day clock. In one or more embodiments, the synchronized network time is maintained by a timer in each receiving device. The pre-determined delay may differ for different receiving devices so as to reduce resource congestion. In other words, the repetitive response output streams may be staggered in time to avoid overwhelming the network, or overwhelming the device receiving the repetitive response output streams. In one or more embodiments, the same command is set up to execute on multiple devices at a point of time in the future. At the future point of time, all multiple devices execute the same command at the same time. In response, notifications will be sent out reporting new results are available. One or more client devices may receive notifications and poll for one or more test results. The one or more client devices are able to act on the one or more test results based on the information contained in such test results.

Figure 1A:
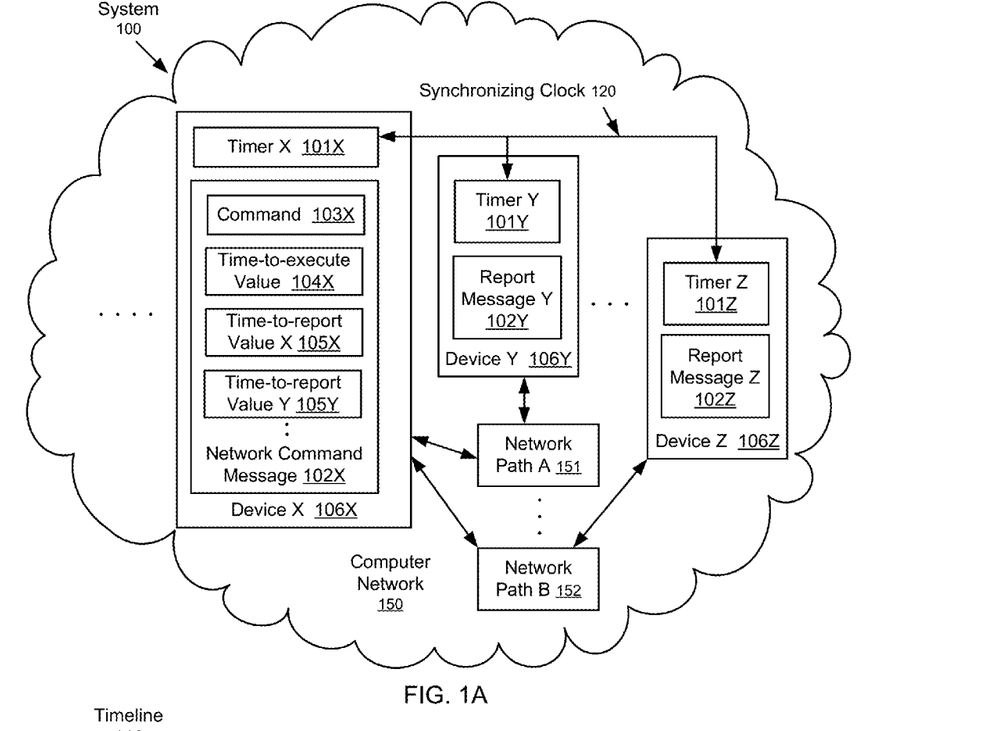
FIG. 1A depicts a block diagram of a system in accordance with one or more embodiments of the invention.

FIG. 1A shows a system (100) in accordance with one or more embodiments. As shown in FIG. 1A, the system (100) includes multiple devices (e.g., device X (106X), device Y (106Y), device Z (106Z)) connected by a computer network (150) in accordance with one or more embodiments. In one or more embodiments, the computer network (150) includes wired and/or wireless portions of a telecommunications network. In one or more embodiments, a telecommunications network includes a collection of devices, links, and any intermediate nodes connected to enable telecommunication between the devices of the telecommunications network. The device X (106X), device Y (106Y), and device Z (106Z) are nodes of the telecommunication network and may be computing devices or networking devices of any type, including servers, routers, switches, mobile phones, desktop or tablet personal computers (PCs), etc. Within the computer network (150), a network path (e.g., network path A (151), network path B (152)) between two devices is a sequence of links, intermediate nodes, and/or any intervening devices that connect the two devices. In one or more embodiments, multiple network paths may exist between two devices. Accordingly, messages or other telecommunication data are exchanged between the two devices via one or more of the network paths. The transmission delay of sending/receiving messages over any particular network path (e.g., network path A (151), network path B (152)) may depend on characteristics of the links, intermediate nodes, and/or any intervening devices contained in the particular network path. In other words, the network path (e.g., network path A (151), network path B (152)) is associated with variable transmission delay of sending/receiving messages.

In one or more embodiments of the invention, one or more devices (e.g., device X (106X)) may be configured to send network command messages (e.g., network command message (102X)) over the computer network (150). Similarly, one or more devices (e.g., device Y (106Y), device Z (106Z)) may be configured to receive network command messages (e.g., network command message (102X)) over the computer network (150). The devices (e.g., device X (106X), device Y (106Y), device Z (106Z)) may include controlling devices in the control plane of the telecommunication network and/or NEs in the data plane of the telecommunication network. For example, the device X (106X) may be a controller in the control plane and may send the network command message (102X) to multiple devices, while the device Y (106Y) and device Z (106Z) may be NEs in the data plane that receive the network command message (102X). In one or more embodiments, the network command message (102X) may be based on TL1 or other management protocols. In one or more embodiments, the network command message (102X) transmits across the network path A (151) and network path B (152) according to a network protocol (e.g., Ethernet, Synchronous Optical Networking (SONET)/Synchronous Digital Hierarchy (SDH), G.709 Optical Transport Network (OTN), etc.) of the computer network (150).

In one or more embodiments of the invention, device X (106X), device Y (106Y), and device Z (106Z) include the timer X (101X), timer Y (101Y), and timer Z (101Z), respectively. For example, the timer X (101X), timer Y (101Y), and timer Z (101Z) may include one or more hardware components, software modules, or a combination thereof.

Figure 1B:
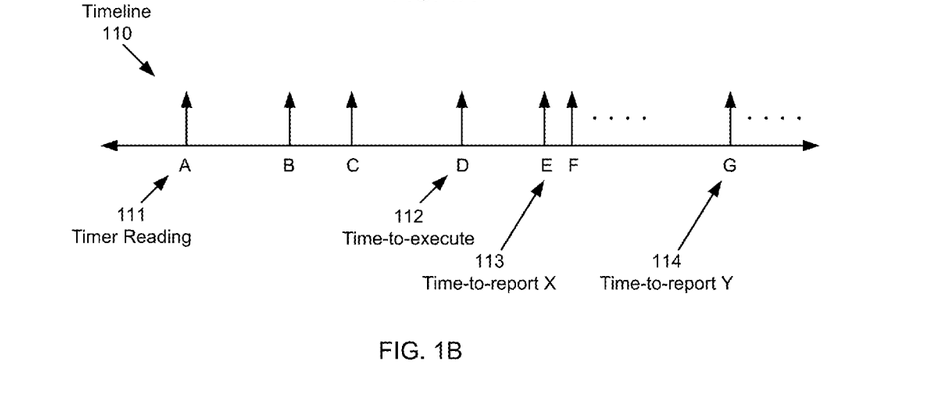
FIG. 1B depicts a timeline in accordance with one or more embodiments of the invention.

In one or more embodiments, timer X (101X), timer Y (101Y), and timer Z (101Z) are synchronized based on the synchronizing clock (120) of the computer network (150). For example, the synchronizing clock (120) may be the time-of-day clock provided via Network Time Protocol (NTP). NTP is a networking protocol for clock synchronization between computer systems over packet-switched, variable-latency data networks. NTP is intended to synchronize the participating computers to within a few milliseconds of Coordinated Universal Time (UTC). In one or more embodiments, the timer values (i.e., timer readings) maintained by one or more of the timer X (101X), timer Y (101Y), and timer Z (101Z) are the same as the UTC. In one or more embodiments, the timer values (i.e., timer readings) maintained by one or more of the timer X (101X), timer Y (101Y), and timer Z (101Z) are synchronized to the UTC with a conversion parameter, such as a device-specific ratio and/or lag. An example timeline (110) representing UTC is shown in FIG. 1B. In particular, the timeline (110) includes time point A through time point G corresponding to particular time points of the UTC.

Returning to FIG. 1A, the network command message (102X) includes a command (103X), a time-to-execute value (104X), and a time-to-report value (105X) in accordance with one or more embodiments. In particular, the command (103X) is a network command that directs a receiving device of the network command message (102X) to perform a specific task, such as a network inventory task, service provisioning task, network configuration and fault management task, surveillance task, memory administration task, access and testing task, etc. In one or more embodiments, the time-to-execute value (104X) specifies the time point for the receiving device to execute, or otherwise process the command (103X). In one or more embodiments, the time-to-report value (105X) specifies the time point for the receiving device to report a result of executing the command (103X). For example, the device Y (106Y) may receive the network command message (102X), execute/process the command (103X), and report the corresponding result by replying a report message Y (102Y) to the device X (106X). Similarly, the device Z (106Z) may receive the network command message (102X), execute/process the command (103X), and report the corresponding result by replying a report message Z (102Y) to the device X (106X).

In one or more embodiments of the invention, the device X (106X) is configured to generate the network command message (102X) by obtaining a current time value (e.g., timer reading (111) shown in FIG. 1B and corresponding to the time point A) from the timer X (101X) and determining the time-to-execute value (104X) based on the current time value. Returning to FIG. 1A, the device X (106X) further obtains a network delay estimate for the network command message (102X) in accordance with one or more embodiments. The network delay estimate is an estimate of transmission delay and other latency associated with transmitting the network command message (102X) to a receiving device and executing the command (103X) by the receiving device. Accordingly, the time-to-execute value (104X) is further determined based on the network delay estimate. For example, the time-to-execute value (104X) may correspond to the time-to-execute (112) shown in the timeline depicted in FIG. 1B and corresponding to the time point D.

Returning to FIG. 1A, in one or more embodiments, the device X (106X) is configured to determine the time-to-report value X (105X) and time-to-report value Y (105Y) based on the current time value and a time lag specific to the receiving device. In one or more embodiments, the time lag is determined by the device X (106X) based on the network delay estimate with respect to a specific receiving device. For example, the time-to-report value X (105X) may correspond to time-to-report X (113) shown in the timeline depicted in FIG. 1B and corresponding to the time point E. Similarly, the time-to-report value Y (105Y) may correspond to time-to-report Y (114) shown in the timeline depicted in FIG. 1B and corresponding to the time point G.

Returning to FIG. 1A, the network command message (102X) once generated is sent by the device X (106X) to the device Y (106Y) and device Z (106Z), e.g., via the network path A (151) and network path B (152), respectively. As a result of indeterminate transmission delays across the network path A (151) and network path B (152), the network command message (102X) may be received by the device Y (106Y) and device Z (106Z) at two different UTC time points, corresponding to the time point B and time point C shown in FIG. 1B. The time gap between the time point B and time point C is referred to as a command skew of the command (103X), or command skew of the network command message (102X).

Continuing with FIG. 1A, the time-to-execute value (104X) is determined by the device X (106X) to account for the indeterminate transmission delay across the network path A (151) such that the time point B and time point C (depicted in the timeline of FIG. 1B) are prior to the time point D. Further, the time-to-report value X (105X) is determined by the device X (106X) to account for the processing/execution time required by the device Y (106Y) such that the time point E is subsequent to the time point D (depicted in the timeline of FIG. 1B) by an appropriate amount specific to the device Y (106Y). Similarly, the time-to-report value Y (105Y) is determined by the device X (106X) to account for the processing/execution time required by the device Z (106Z) such that the time point G is subsequent to the time point D (depicted in the timeline of FIG. 1B) by an appropriate amount specific to the device Z (106Z).

In one or more embodiments, the time-to-report value Y (105Y) is further determined by the device X (106X) to stagger the time point E and time point G (depicted in the timeline of FIG. 1B) so as to reduce resource contention for transmitting and processing the report message Y (102Y) and report message Z (102Z). For example, the report message Y (102Y) and report message Z (102Z) may be received and processed by the device X (106X), or other device that subscribes to receiving reports from the device Y (106Y) and/or device Z (106Z).

Continuing with FIG. 1A, the report message Y (102Y) may include a sequence of results sent by the device Y (106Y) at a sequence of time points depicted in the timeline of FIG. 1B, such as the time point E, time point F, etc. The time gap between the time point E and time point F is referred to as an interval of generating consecutive results. In one or more embodiments, the sequence of results spans a specified time period before being terminated. Similarly, the report message Z (102Z) may include a sequence of results sent by the device Z (106Z) at a sequence of time points starting from the time point G as depicted in the timeline of FIG. 1B. Staggering the time points when the report message Y (102Y) and report message Z (102Z) are sent avoids overwhelming the bandwidth of the computer network (150), and/or overwhelming the processing capacity of the device X (106X).

Although FIG. 1A only shows three devices (i.e., device X (106X), device Y (106Y), device Z (106Z)) and two network paths (i.e., network path A (151), network path B (152)), those skilled in the art, having the benefit of this detailed description, will appreciate that the system (100) may have any number of devices and network paths. Further, although FIG. 1A only shows one time-to-execute value (104X) and two time-to-report-values (i.e., time-to-report-value X (105X), time-to-report-value Y (105Y)) in a single network command message (102X), those skilled in the art, having the benefit of this detailed description, will appreciate that the system (100) may have any number of time-to-execute values and time-to-report-values in the single network command message (102X). In one or more embodiments of the invention, the operations of the system (100) are performed using the method described in reference to FIG. 2 below.

Figure 2:
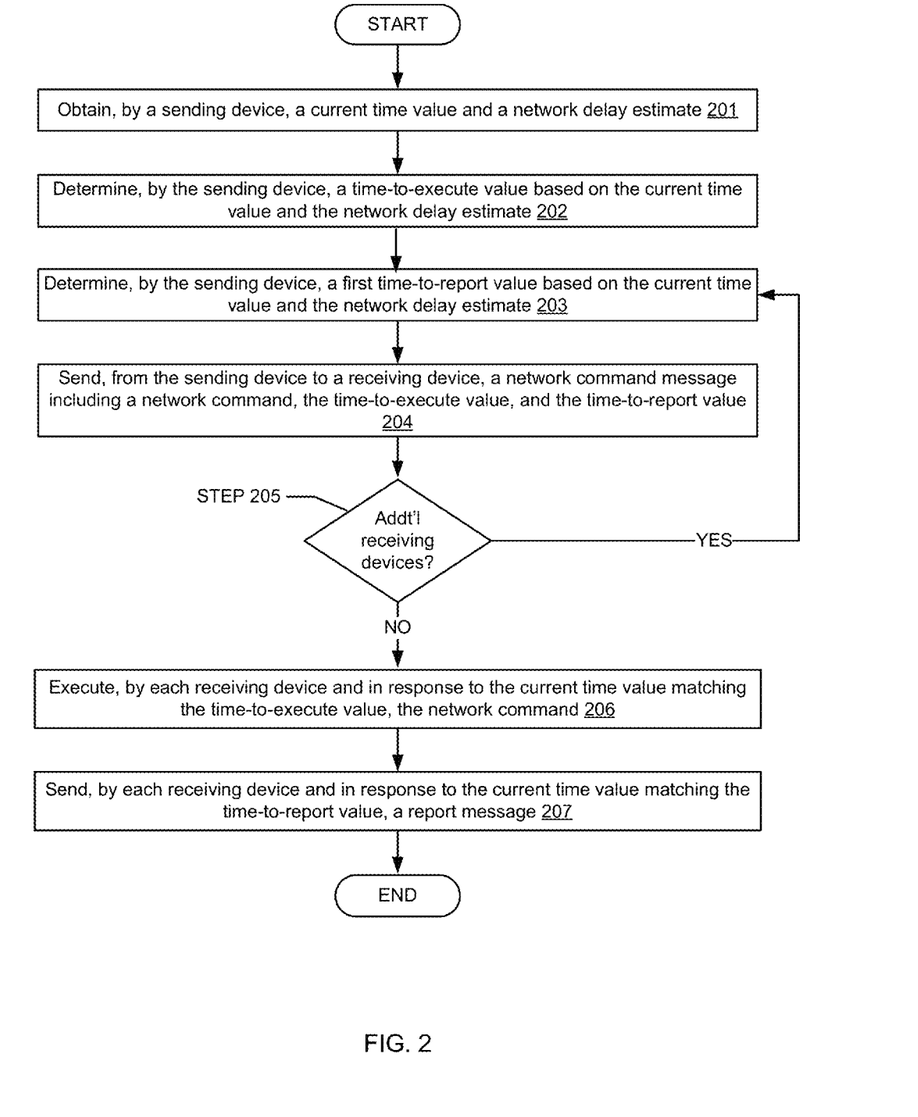
FIG. 2 shows a flowchart of a method in accordance with one or more embodiments of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments, the method described in reference to FIG. 2 may be practiced using the system (100).

Initially in Step 201, a current time value and a network delay estimate are obtained by a sending device prior to sending a network command message in a computer network. In one or more embodiments, the current time value is obtained from a timer of the sending device. In particular, the timer is synchronized with a network time of the computer network, such as maintained based on the Network Time Protocol (NTP). In one or more embodiments, the network delay estimate is determined by examining the messaging network path from the sending device to one or more receiving devices of the network command message in the computer network. For example, the sending device may perform a transmission delay measurement for each receiving device using a network software utility, such as traceroute, ping, etc., or perform a transmission delay computation of the network topology with respect to each receiving device, such as based on the open shortest path first (OSPF) protocol, etc. While accuracy is desirable, variable latency will always be problematic. Even a good estimate for an upper-bound is problematic as the communication link could be broken and the destination node unreachable. While the situation is not desirable, the late delivery or undeliverable message should be dealt with through other means.

In Step 202, a time-to-execute value is determined by the sending device based on the current time value and the network delay estimate. In one or more embodiments, the network command message is set up to instruct all receiving devices to simultaneously execute a command embedded in the network command message. The sending device first identifies the longest network delay estimate among all receiving devices. Accordingly, the time-to-execute value is determined as a value exceeding a sum of the current time value and the longest network delay estimate by an appropriate amount. For example, the appropriate amount may be determined based on an estimated latency associated with the sending device sending the network command message to all receiving devices, as well as an estimated latency of each receiving device processing the received network command message prior to execution.

In this manner, all receiving devices may be ready to execute the command prior to the network time of the computer network reaching the time-to-execute value. In one or more embodiments, the estimated latencies may be pre-configured parameters in the sending device. In one or more embodiments, the estimated latencies may be dynamically determined by the sending device based on an estimated resource utilization factor of the sending device and/or the receiving devices. For example, the estimated resource utilization factor of a receiving device may be requested from, or automatically provided by the receiving device on a periodic basis.

In Step 203, a time-to-report value is determined by the sending device for a particular receiving device based on the current time value and the network delay estimate. In one or more embodiments, the network command message is set up to instruct the receiving device to report the result of executing the command. Specifically, the receiving device is instructed to report the result when the network time of the computer network reaches the time-to-report value.

In one or more embodiments, the time-to-report value is determined as a value exceeding the sum of the current time value and network delay estimate of the receiving device by an appropriate amount. For example, the appropriate amount may be determined based on an estimated latency of the receiving device processing and executing the received network command message, as well as an estimated latency of the receiving device preparing the report message. In this manner, the receiving device may be ready to send the report message prior to the network time of the computer network reaching the time-to-report value.

The estimated latencies may be pre-configured parameters in the sending device. In one or more embodiments, the estimated latencies may be dynamically determined by the sending device based on an estimated resource utilization factor of the receiving device. For example, the estimated resource utilization factor of the receiving device may be requested from, or automatically provided by, the receiving device on a periodic basis. In one or more embodiments, the time-to-report value may further include an offset specific to the receiving device. For example, the offset may vary for different receiving devices to stagger the report message transmissions of multiple receiving devices via the computer network. In other words, a time lag of consecutive report message transmission is created based on the difference between the offsets of multiple receiving devices.

In Step 204, the network command message is sent from the sending device to the receiving device in accordance with one or more embodiments. Prior to sending, the sending device inserts the time-to-execute value and the time-to-report value along with the command itself in the network command message. In one or more embodiments, the network command message is set up to further instruct the receiving device to repeat execution of the command at a regular interval during a specified time period. In such embodiments, a consecutive portion of the repeated execution results may be aggregated into a batch report for a specified number of executions. The interval, the specified time period, and the number of individual execution results in the batch report are also inserted by the sending device in the network command message.

In Step 205, a determination is made as to whether the network command message is to be sent to additional receiving device(s). If the determination is positive, i.e., the network command message is to be sent to at least one more receiving device, the method returns to Step 203. Otherwise, if the determination is negative, i.e., no additional receiving device(s) is yet to be sent the network command message, the method proceeds to Step 206.

In Step 206, each receiving device processes the network command message and executes the command when the network time of the computer network reaches the time-to-execute value. In one or more embodiments, the receiving device extracts the time-to-execute value from the network command message and repetitively obtains a current time value from a timer of the receiving device. In particular, the timer of the receiving device is synchronized with the network time of the compute network, e.g., based on the NTP. Accordingly, the receiving device repetitively compares the current time value to the time-to-execute value and executes the command in response to the current time value matching the time-to-execute value. In one or more embodiments, the receiving device executes the command further based on the interval for repeat execution and the specified time period for repeat execution that are extracted from the network command message.

In Step 207, each receiving device prepares and sends a report message when the network time of the computer network reaches the time-to-report value. In one or more embodiments, the receiving device extracts the time-to-report value from the network command message, and repetitively obtains the current time value from the timer of the receiving device. Accordingly, the receiving device repetitively compares the current time value to the time-to-report value and sends the report message in response to the current time value matching the time-to-report value. In one or more embodiments, the receiving device sends the report message further based on one or more of the specified interval for repeat execution, the specified time period for repeat execution, and the specified number of individual execution results in the batch report that are extracted from the network command message.

Figure 3:
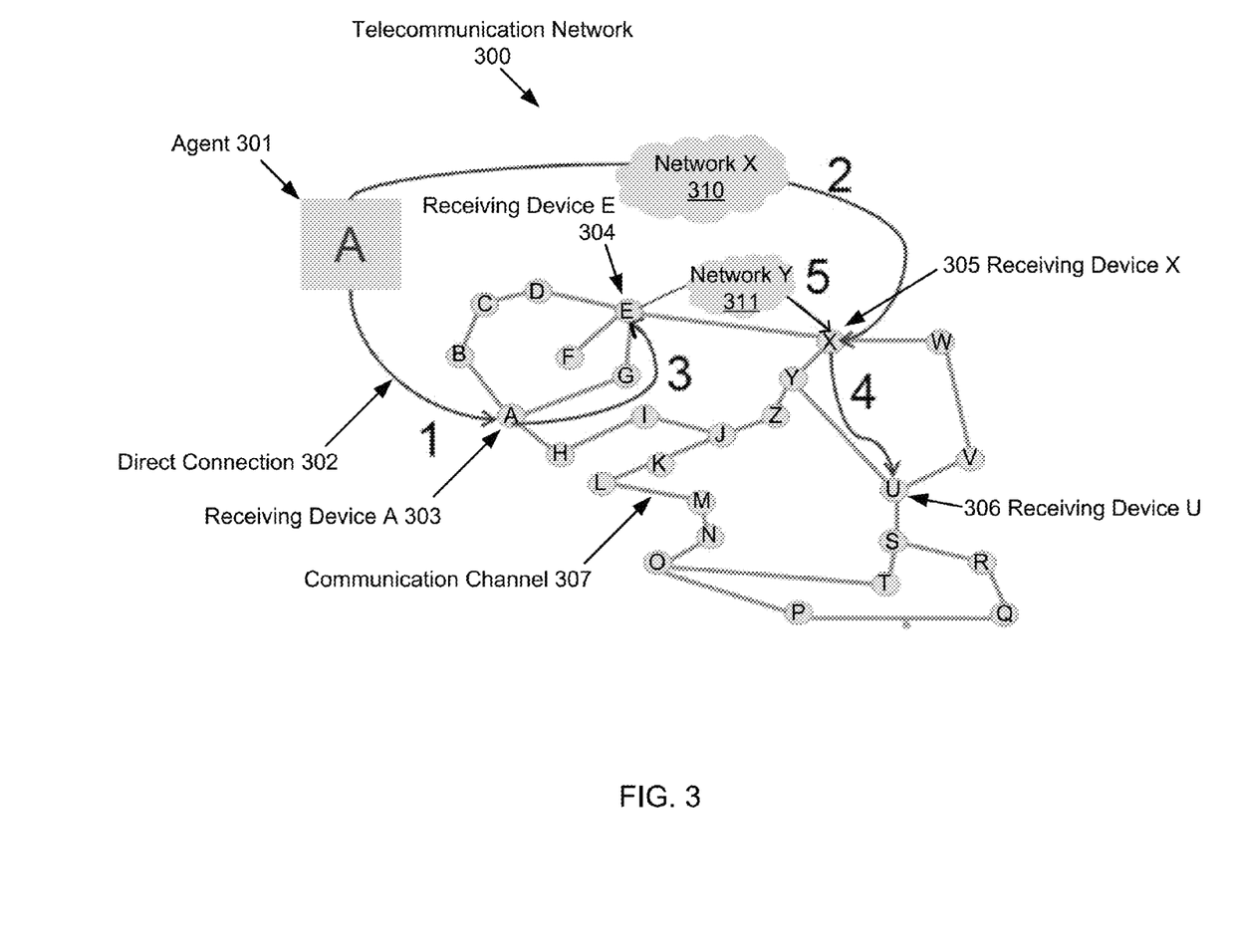
FIG. 3 shows an example in accordance with one or more embodiments of the invention.

FIG. 3 shows an example in accordance with one or more embodiments of the invention. As depicted in FIG. 3, the example may be practiced using the system (100) and the method described in reference to FIGS. 1A, 1B, and 2 above in accordance with one or more embodiments of the invention.

FIG. 3 shows a telecommunication network (300) coupled with a network X (310) and a network Y (311) that are separate from and supplementary to the telecommunication network (300). In particular, the telecommunication network (300) includes a control plane and a data plane.

The control plane includes at least one controller device, such as an agent (301). The data plane includes multiple network elements (NEs), such as NE A through NE Z that are connected via communication channels. As shown in FIG. 3, each NE is represented by a circle enclosing an uppercase alphabetic letter identifying the NE, while line segments connecting the NEs represent the communication channels. For example, the NE A, NE, E, NE U, and NE X correspond to a receiving device A (303), a receiving device E (304), a receiving device U (306), and a receiving device X (305), respectively. In addition, the line segment connecting NE L and NE M corresponds to the communication channel (307), which may allow the transmission of an electrical signal, wireless signal, optical signal, or a combination thereof. The signals may be transmitted over a large distance (e.g., over 10,000 kilometer (km)) between two NEs using various transmission media, such as copper, optical fiber, open air, etc.

Further, as shown in FIG. 3, each curvilinear line with open arrow and annotated with a numeral represents a portion of network paths from the agent (301) to receiving device A (303), receiving device E (304), receiving device U (306), and receiving device X (305). Periodically, the agent (301) may send network command messages via the network paths to collect network management data from the NEs. The network paths may include portions of various types. For example, the curvilinear line 1 represents a direct connection, the curvilinear line 2 and curvilinear line 5 represent connections via alternate networks (i.e., network X (310), network Y (311), the curvilinear line 3 and curvilinear line 4 represent connections via one or more communication channels. Accordingly, variations of these signal transmission delays across various types of network path portions result in the command skews of the network command messages, as observed at the receiving device A (303), receiving device E (304), receiving device U (306), and receiving device X (305).

In the example shown in FIG. 3, the network command message is based on a TL1 interface. Specifically, a tag field specified in TL1 is extended to specify the time-to-execute and the time-to-report. Further, the tag field may also be used to specify a time interval of repeated report messages, the time when the repeated report messages terminate, a number of report messages to be batched for reporting, and a time offset to stagger report messages from multiple receiving devices. For example, the TL1 message RMV-SNC::SNC-19-1:TAG; may be extended as RMV-SNC::SNC-19-1:TAG,CCYYMMDDhhmmss; where CCYYMMDDhhmmss specifies the time-to-execute, CC=Century, YY=Year, MM=month, DD=Day, and hhmmss=hour (24 h), minute, second.

By scheduling the commands to execute at a deterministic time, the commands may be issued early (once) and the links between the agent (301) and NEs are used to relay the response back. Because the scheduled output of the command is injected on the extended TL1 interface, the agent (301) is not required to support an additional (new) interface to receive and process the scheduled command output. Alternatively, the scheduled command output may also be optionally injected on an additional subscription interface. In either case, the need for deterministic ad-hoc message delivery from the agent (301) to the NEs is removed.

In another example, the TL1 tag field is extended to allow the command to execute at the specified time-to-execute (denoted as STARTTIME), repeated at each INTERVAL, discontinued at the STOPTIME, with output reports sent as a batch file. In this example, the TL1 message above is extended as RTRV-SNC::SNC-19-1:TAG,STARTTIME, STOPTIME, INTERVAL, BATCH, OFFSET; where STARTTIME, STOPTIME, INTERVAL, and OFFSET are in the same format CCYYMMDDhhmmss described above. In addition, BATCH is an integer specifying the number of times consecutive outputs are aggregated into a single report message, and OFFSET specifies the delay after a particular INTERVAL when the report message is sent. In other words, the report message with aggregated consecutive outputs is sent at STARTTIME+INTERVAL*BATCH+OFFSET, which corresponds to the time-to-report described above.

In summary, the extended TL1 interface allows a command to be run repeatedly and the results to be held (batched up) and reported as a group. By examining the messaging network path (e.g., via trace route, open shortest path first (OSPF) network topology, etc.), and the particular time point when each NE is instructed to report the result, the agent (301) may schedule the NEs to buffer output results before attempting to send the aggregated report message to the agent (301). This is especially beneficial in the scenario of collecting a wall-clock sample from a large number of network elements without overwhelming the network or the agent.

To reduce the network and/or agent capacity congestion, the STARTTIME, STOPTIME, INTERVAL, and OFFSET may be determined based on the number of network elements involved, relative latency and transmission bandwidth from agent to network elements, estimated size of network command message, and expected size of report messages.

In an example scenario, the agent (301) sends commands to collect a series of data from each of ten NEs coupled in a linear sequence, namely NE A, NE B, NE C, NE D, NE E, NE X, NE W, NE V, NE U, and NE S. In the linear sequence, the NE A is one hop away from the agent (301), NE B is two hops away from the agent (301), and so on and so forth with NE S ten hops away from the agent (301). In the example scenario, the transmission bandwidth (BW) in each hop is approximately one megabit per second (Mb/sec) or 0.125 megabyte per second (MB/sec) with 10 percent waste for protocol overhead. Therefore, the expected BW=0.1125 MB/sec. Further, the expected report message size is 0.1 MB and the interval for collecting consecutive data sample in the series of data is 13:00:00 hours. Based on the 0.1 MB message size, the expected transmission time is 0.1 MB/(0.1125 MB/sec)=0.89 seconds. Therefore, staggering the reporting offset time by a larger amount (e.g., one second) for every additional NE beyond the NE A may reduce the network congestion.

Additional offset may be added to prevent congestion further on the agent (301). For example, the agent (301) may use OSPF, ping, and/or traceroute to determine that NE S is the furthest away in the ten hop sequence NEs. Accordingly, the agent (301) may compute the time-to-execute based on pre-determined network and NE characteristics, such as agent to NE A latency being zero ms, each NE being 1000 km apart with each hop corresponding to five millisecond (ms) of transmission time, the NE packet handling taking one ms, command scheduling time in each NE taking fifty ms, and the network command message size being one hundred bytes (negligible). Based on these network and NE characteristics, the agent (301) first computes the time for the command to reach NE S and be scheduled by the NE S for processing as 0 ms+9*5 ms+10*1 ms+50 ms=105 ms. Alternatively, the agent (301) may also compute the time for the command to reach NE S and be scheduled by the NE S for processing as ping time/2+50 ms.

If the clock accuracy of the timer in each NE deviates by <ten ms, then a command dispatched by the agent (301) to NE S may take 115 ms to start processing, assuming no congestion. In other words, if the agent (301) dispatches ten unacknowledged commands, then the earliest NE S may execute the command is in 115 ms. Therefore, the time-to-execute may be set as 115 ms for all NEs to execute at the same time.

Embodiments of the invention may be implemented on virtually any type of hardware, firmware, and/or computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention.

Figure 4:
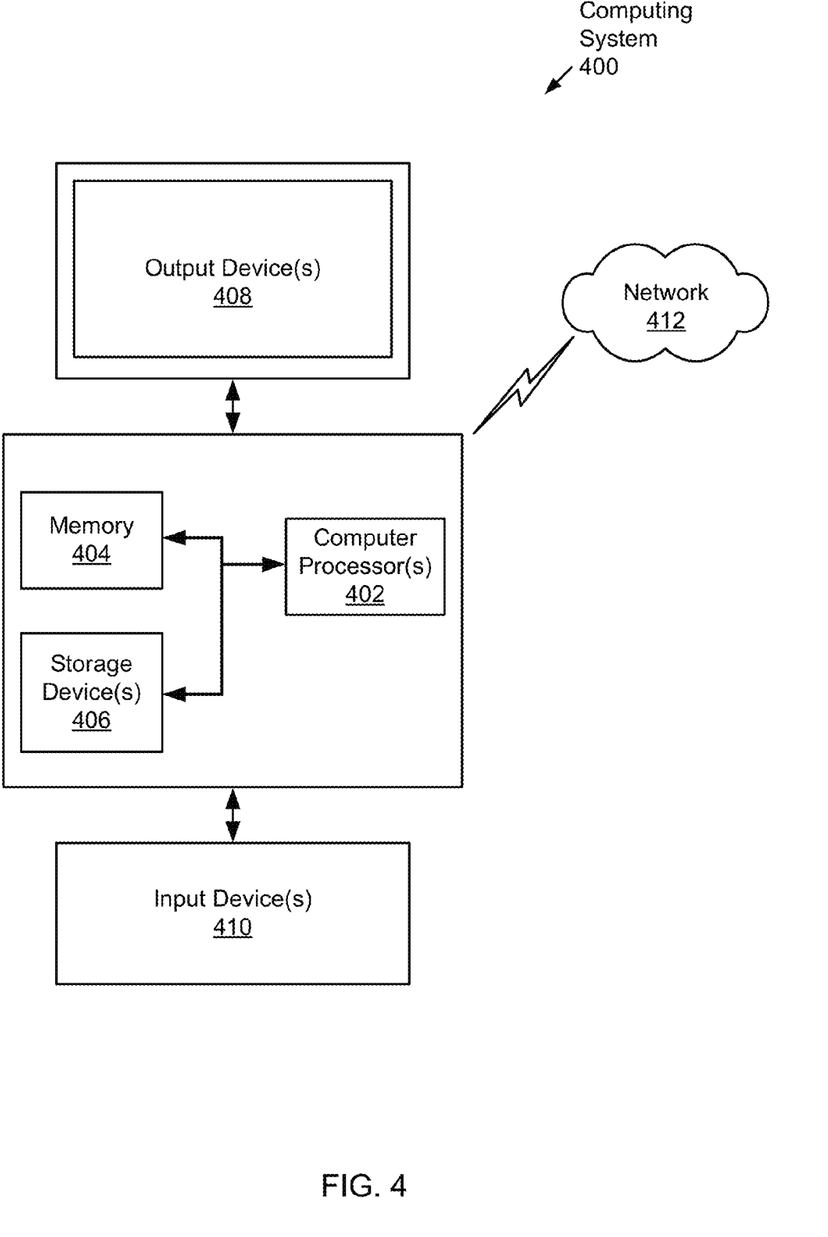
FIG. 4 shows a computer system in accordance with one or more embodiments of the invention.

For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The input and output device(s) may be locally or remotely connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other non-transitory computer readable storage medium. Specifically, the software instructions may correspond to computer readable program code that when executed by a processor(s), is configured to perform embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for executing a network command using synchronized timers, comprising:
    determining, by a first device, a first time-to-report value based at least on a first current time value from a first timer of the first device;
    determining, by the first device, a time lag based at least on a parameter of a computer network;
    determining, by the first device, a time-to-execute value based at least on the first current time value;
    sending, from the first device to a second device via the computer network, a first network command message comprising the network command, the time-to-execute value, and the first time-to-report value;
    sending, from the first device to a third device via the computer network, a second network command message comprising the network command, the time-to-execute value, and a second time-to-report value, wherein the first time-to-report value and the second time-to-report value are separated by the time lag to reduce a resource contention of sending a first report message and a second report message via the computer network;
    repetitively obtaining, by the second device, a second current time value from a second timer;
    comparing, by the second device and in response to receiving the first network command message, the second current time value to the time-to-execute value extracted from the first network command message;
    executing, by the second device and in response to the time-to-execute value matching the second current time value, the network command;
    receiving, by the first device from the second device and in response to the second timer of the second device reaching the first time-to-report value, the first report message comprising a first result of executing the network command by the second device;
    repetitively obtaining, by the third device, a third current time value from a third timer;
    comparing, by the third device and in response to receiving the second network command message, the third current time value to the time-to-execute value extracted from the second network command message;
    executing, by the third device and in response to the time-to-execute value matching the third current time value, the network command; and
    receiving, by the first device from the third device and in response to the third timer of the third device reaching the second time-to-report value, the second report message comprising a second result of executing the network command by the third device,
    wherein the first timer, the second timer, and the third timer are synchronized within a pre-determined tolerance.

2. The method of claim 1, wherein the first timer, the second timer, and the third timer are based on a time-of-day clock.

3. The method of claim 1, wherein the computer network comprises variable transmission delays.

4. The method of claim 1, further comprising:
    comparing, by the second device and in response to receiving the first network command message, the second current time value from the second timer to the first time-to-report value extracted from the first network command message, determining, by the second device, that the second timer reaches the first time-to-report value based on the second current time value matching the first time-to-report value.

5. The method of claim 1, further comprising:
comparing, by the third device and in response to receiving the second network command message, the third current time value from the third timer to the second time-to-report value extracted from the second network command message,
determining, by the third device, that the third timer reaches the second time-to-report value based on the third current time value matching the second time-to-report value.

6. The method of claim 1, further comprising:
determining, by the first device, the second time-to-report value based on the first time-to-report value and the time lag.

7. A system, comprising:
a computer network coupling a first device, a second device, and a third device;
the first device having a first timer and configured to:
determine a first time-to-report value based at least on a first current time value,
determine a time-to-execute value based at least on the first current time value,
determine a time lag based at least on a parameter of the computer network,
send, to the second device via the computer network, a first network command message comprising a network command, the time-to-execute value, and the first time-to-report value, and
send, to the third device via the computer network, a second network command message comprising the network command, the time-to-execute value, and a second time-to-report value, wherein the first time-to-report value and the second time-to-report value are separated by the time lag to reduce a resource contention of sending a first report message and a second report message via the computer network;
the second device having a second timer and configured to:
repetitively obtain a second current time value from the second timer,
compare, in response to receiving the second network command message, the second current time value to the time-to-execute value extracted from the second network command message,
execute, in response to the time-to-execute value matching the second current time value, the network command, and
send, to the first device and in response to the second timer reaching the first time-to-report value, the first report message comprising a first result of executing the network command by the second device; and
the third device having a third timer and configured to:
repetitively obtain a third current time value from the third timer,
compare, in response to receiving the second network command message, the third current time value to the time-to-execute value extracted from the second network command message,
execute, in response to the time-to-execute value matching the third current time value, the network command, and
send, to the first device and in response to the third timer reaching the second time-to-report value, the second report message comprising a second result of executing the network command by the third device, wherein the first timer, the second timer, and the third timer are synchronized within a pre-determined tolerance.

8. The system of claim 7, wherein the first timer, the second timer, and the third timer are based on a time-of-day clock.

9. The system of claim 7, wherein the computer network is configured to send the first network command message with a variable transmission delay.

10. The system of claim 7,
wherein the second device is further configured to:
compare, in response to receiving the first network command message, the second current time value from the second timer to the first time-to-report value extracted from the first network command message, and
determine that the second timer reaches the first time-to-report value based on the second current time value matching the first time-to-report value.

11. The system of claim 7, further comprising:
wherein the third device is further configured to:
compare, in response to receiving the second network command message, the third current time value from the third timer to the second time-to-report value extracted from the second network command message,
determine that the third timer reaches the second time-to-report value based on the third current time value matching the second time-to-report value.

12. The system of claim 11, the first device further configured to:
determine the second time-to-report value based on the first time-to-report value and the time lag.

13. A non-transitory computer readable medium storing instructions for executing a network command using synchronized timers, the instructions, when executed by a computer processor, comprising functionality for:
determining, by a first device, a first time-to-report value based at least on a first current time value from a first timer of the first device;
determining, by the first device, a time lag based at least on a parameter of a computer network;
determining, by the first device, a time-to-execute value based at least on the first current time value;
sending, from the first device to a second device via the computer network, a first network command message comprising the network command, the time-to-execute value, and the first time-to-report value;
sending, from the first device to a third device via the computer network, a second network command message comprising the network command, the time-to-execute value, and a second time-to-report value, wherein the first time-to-report value and the second time-to-report value are separated by the time lag to reduce a resource contention of sending a first report message and a second report message via the computer network;
repetitively obtaining, by the second device, a second current time value from a second timer;
comparing, by the second device and in response to receiving the first network command message, the second current time value to the time-to-execute value extracted from the first network command message;

executing, by the second device and in response to the time-to-execute value matching the second current time value, the network command;

receiving, by the first device from the second device and in response to a second timer of the second device reaching the first time-to-report value, the first report message comprising a first result of executing the network command by the second device;

repetitively obtaining, by the third device, a third current time value from a third timer;

comparing, by the third device and in response to receiving the second network command message, the third current time value to the time-to-execute value extracted from the second network command message;

executing, by the third device and in response to the time-to-execute value matching the third current time value, the network command; and receiving, by the first device from the third device and in response to the third timer of the third device reaching the second time-to-report value, the second report message comprising a second result of executing the network command by the third device, wherein the first timer, the second timer, and the third timer are synchronized within a pre-determined tolerance.

14. The non-transitory computer readable medium of claim 13, wherein the first timer, the second timer, and the third timer are based on a time-of-day clock.

15. The non-transitory computer readable medium of claim 13, wherein the computer network comprises variable transmission delays.

16. The non-transitory computer readable medium of claim 13, the instructions further comprising functionality for:

comparing, by the second device and in response to receiving the first network command message, the second current time value from the second timer to the first time-to-report value extracted from the first network command message, determining, by the second device, that the second timer reaches the first time-to-report value based on the second current time value matching the first time-to-report value.

17. The non-transitory computer readable medium of claim 16, the instructions further comprising functionality for:

comparing, by the third device and in response to receiving the second network command message, the third current time value from the third timer to the second time-to-report value extracted from the second network command message, determining, by the third device, that the third timer reaches the second time-to-report value based on the third current time value matching the second time-to-report value.

* * * * *